Oct. 25, 1966  A. D. LUIZ  3,280,943
WHEEL BLOCK ASSEMBLY
Filed Oct. 2, 1964
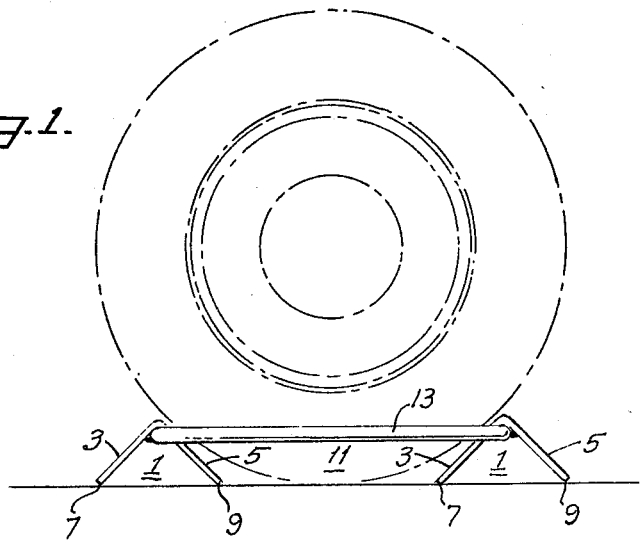
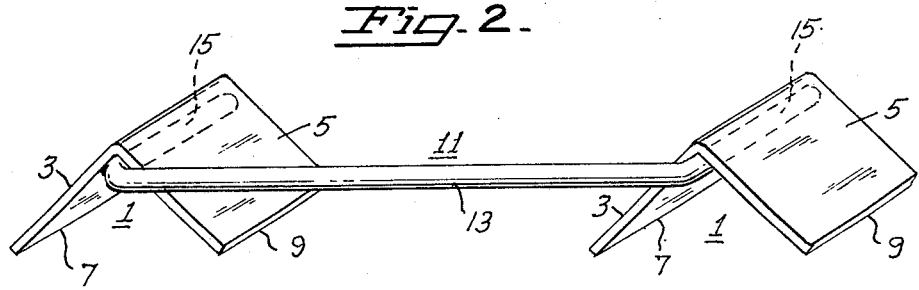
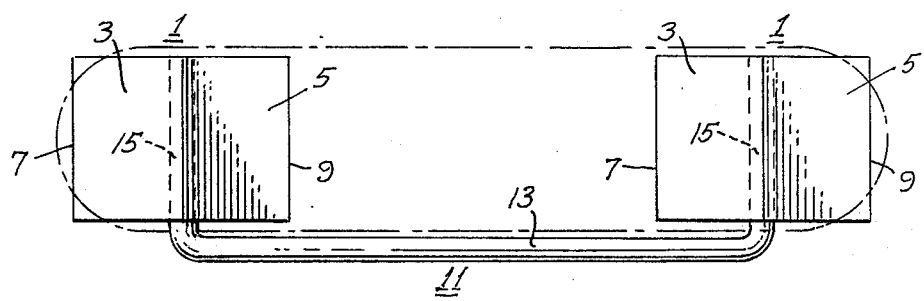
INVENTOR
ANTHONY DUANE LUIZ
BY
*Bruce & Brosler*
HIS ATTORNEYS

United States Patent Office 3,280,943
Patented Oct. 25, 1966

3,280,943
WHEEL BLOCK ASSEMBLY
Anthony Duane Luiz, P.O. Box 283, Pinole, Calif.
Filed Oct. 2, 1964, Ser. No. 401,045
3 Claims. (Cl. 188—32)

My invention relates to a wheel block assembly for parked vehicles.

Automotive vehicles when parked on an incline are apt to slip their brakes and run wild downgrade. Accordingly, it has been the practice under such conditions, to block one or more of the wheels of a parked vehicle, by jamming an available rock against a wheel, or employing a triangular shaped block for such purpose.

Similar expedients are employed to prevent the car from slipping off jacks when servicing a tire of such car. In such instances, blocking possible movement of the car in either direction is desirable.

Among the objects of my invention are:

(1) To provide a novel and improved wheel block assembly for a parked vehicle;

(2) To provide a novel and improved wheel block assembly which will inhibit movement of the vehicle in either the forward or reverse direction;

(3) To provide a novel and improved wheel block assembly which is adapted to effect a secure grip on its supporting surface;

(4) To provide a novel and improved wheel block assembly in the form of a rigid unitized assembly, capable of inhibiting movement of a parked car in either forward or reverse direction;

(5) To provide a novel and improved wheel block assembly which may be accurately positioned quickly and with ease;

(6) To provide a novel and improved wheel block assembly which, when once positioned will resist accidental displacement.

Additional objects of my invention will be brought out in the following description of a preferred embodiment of the same, taken in conjunction with the accompanying drawings wherein:

FIGURE 1 is a view in elevation of a wheel block assembly of the present invention showing its application to the wheel of a parked vehicle;

FIGURE 2 is a three-dimensional view of the wheel block assembly of the present invention;

FIGURE 3 is a view in plan, of the wheel block assembly of FIGURE 2.

Referring to the drawings for details of my invention in its preferred form, the same comprises a pair of wheel blocks 1 in the form of like sections of angle iron, each including plates 3 and 5 joining each other along an edge at substantially a right angle to each other, to provide parallel ground engageable edges 7 and 9. The term "angle iron" is merely descriptive of shape and not to be construed as limited to iron as the material from which the blocks are made, since any material suitable for the purpose may be used.

Rigidly connecting the two wheel blocks, is a connecting bar 11, preferably of pipe, bent at each end to provide a main section 13 and end sections 15 at substantially right angles to the main section, with each end portion entering a block through an open end thereof and being welded thereto along or adjacent the apex of the angle formed by the side plates.

The distance between the blocks should be such as to properly position the same in blocking position with respect to a wheel.

When constructed as described, one may utilize the connecting bar as a handle and/or kick bar, in placing the block assembly in position. The functional position of the blocks may be determined by bringing the bar into contact with the side wall of the tire or proximately so. When properly positioned, each block will assist the other in resisting slippage, and not only will accidental movement of the vehicle in either the forward or the reverse direction be prevented, but each block will further function as a weight at the end of a substantial lever arm to stabilize the other in the event one or the other of said blocks tends to tilt when exposed to the thrust of a wheel.

It will be apparent that with each block formed of angularly disposed plates or an equivalent section of an angle beam, that the same will engage and grip the supporting surface with greater security against slippage than a solid block, which would tend to encourage slippage, if anything.

From the foregoing description of my invention in its preferred form, it will be apparent that the same is subject to minor alterations and modification without departing from the underlying principles involved, and I accordingly do not desire to be limited in my protection to the specific details illustrated and described except as may be necessitated by the appended claims.

I claim:

1. A wheel block assembly for a vehicle wheel, comprising
   a section of angle iron, including plates joining each other along an edge at substantially a right angle to each other, to provide a pair of ground engageable edges,
   a bar including a main section and an end section at substantially right angles thereto, and means affixing said bar to said angle iron section in spaced relationship to the plane of said ground engageable edges and with said bar right angle section between the plates of and along the apex of the angle of said angle iron section,
   and a weight at the opposite end of said bar.

2. A wheel block assembly for a vehicle wheel, comprising
   a pair of like sections of angle iron, each including plates joining each other along an edge at substantialy a right angle to each other, to provide a pair of ground engageable edges,
   a bar including a main section and end sections at an angle thereto,
   and means rigidly affixing said bar to said angle iron sections, in spaced relationship to the plane of said ground engageable edges and with each of said angle sections of said bar extending between the plates of one of said angle iron sections and welded thereto.

3. A wheel block assembly for a vehicle wheel, comprising
   a pair of like sections of angle iron, each including plates joining each other along an edge at substantially a right angle to each other, to provide a pair of ground engageable edges,
   a bar including a main section and end sections at substantially right angle thereto,
   and means affixing said bar to said angle iron sections, in spaced relationship to the plane of said ground engageable edges and with each of said right angle sections of said bar extending between the plates of and rigidly affixed along the apex of the angle of one of said angle iron section.

References Cited by the Examiner
UNITED STATES PATENTS
3,120,292  2/1964  Rambat _____ 188—32
FOREIGN PATENTS
675,784  11/1929  France.

DUANE A. REGER, *Primary Examiner.*